United States Patent Office 3,556,945
Patented Jan. 19, 1971

3,556,945
ENZYME STABILIZATION
Ralph A. Messing, Horseheads, N.Y., assignor to Corning Glass Works, Corning, N.Y., a corporation of New York
No Drawing. Filed Feb. 5, 1968, Ser. No. 702,829
Int. Cl. C07g 7/02
U.S. Cl. 195—63          7 Claims

ABSTRACT OF THE DISCLOSURE

This invention relates to the stabilization of enzymes by coupling the enzymes to an inorganic carrier containing reactive silanol groups through hydrogen and amine-silicate bonding whereby the enzyme becomes insoluble and can be used and reused over an extended period of time.

---

An enzyme is a biological catalyst capable of initiating, promoting and governing a chemical reaction without being used up in the process or becoming part of the product formed. It is a proteinaceous substance synthesized by plants, animals and micro-organisms.

All enzymes isolated thus far have been found to be proteins, i.e., peptide polymers of amino acids. An enzyme may contain prosthetic groups such as flavin adenine dinucleotide, porphyrin, diphosphopyridine nucleotide, etc. Some enzymes require metal ions such as $Mg^{++}$ or $Mn^{++}$ for activity. Enzymes are macromolecules, generally, having a molecular weight greater than 6,000. The isoelectric point of enzymes, the pH value at which the net charge on the surface of the molecules is zero, is from somewhat less than 1.0 through 11.0. At or near this hydrogen ion concentration, the enzymes being proteins usually tend to coagulate.

The specificity of enzymes and their ability to catalyze reactions of substrates at low concentrations has been of particular interest in chemical analysis. Enzyme catalyzed reactions have been used for some time for the determination of substrates, activators, inhibitors, and also of enzymes themselves. Until recently the disadvantages arising from the use of enzymes have seriously limited their usefulness. Objections to the use of enzymes have been their instability, lack of availability, poor precision, and the cost of performing the analyses. Furthermore, the cost of using large amounts of enzymes in analytical chemistry, especially in routine analysis has been a particularly difficult problem.

Attempts have been made to prepare enzymes in an immobilized form without the loss of activity so that one sample could be used continuously for many hours. he immobilized enzyme is used in the same way that soluble enzymes are used, that is, to determine the concentration of a substrate being acted upon by the enzyme, an inhibitor that inactivates the enzyme, or an activator that provides an acceleration in enxyme activity. Enzymes have been diazotized to cellulose particles and to polyaminostyrene beads. Attempts have been made to physically entrap the enzymes by adsorption, absorption, or by ion exchange. Enzymes have also been immobilized on polytyrosyl polypetides, collodion matrices and encapsulated in semipermeable microcapsules made of synthetic polymers.

The carriers for immobilizing the enzymes heretofore used have all been organic materials, especially organic polymers. The main disadvantage of using organic materials is that they are subject to microbial attack resulting from the presence of carbon atoms in the polymer chain whereby the carrier is broken down and the enzyme solubilized. In addition, the coupling mechanism is by means of diazo bonding through a coupling group whereby the enzyme molecules are bound to the carrier only at various distal points along the length of the enzyme chain. When placed in aqueous solution the molecules can unfold, denaturing the protein and consequently resulting in loss of enzyme activity.

Quite surprisingly, I have discovered a method of stabilizing enzymes by binding the enzyme to an inorganic carrier which is substantially immune to attack by microbial organisms and whereby the enzyme is strongly bonded to the carrier along the length of the chain. By the use of these carriers highly stable enzymes can be prepared which can be used and reused over extended periods of time without loss of enzyme activity. It is thus possible to calibrate the activity of the enzyme and have some certainty that upon reuse, its activity level will be substantially constant. These stabilized enzymes find considerable use in analytical procedures and may also be used in the preparation of chemicals, pharmaceuticals and foodstuffs.

In accordance with the present invention I have discovered an insoluble stabilized enzyme composition comprising an enzyme and an inorganic carrier having a high surface area and reactive silanol groups such that the enzyme is coupled to the carrier by means of both hydrogen bonding and amine-silicate bonding. I have also found a method of coupling the enzyme to the inorganic carrier.

The enzymes capable of being stabilized as described herein include a wide variety of enzymes which may be classified under three general headings: hydrolytic enzymes, redox enzymes, and transferase enzymes. The first group, hydrolytic enzymes, include proteolytic enzymes which hydrolyze proteins, e.g. papain, ficin, pepsin, trypsin, chymotrypsin, bromelin, keratinase, carbohydrases which hydrolyze carbohydrates, e.g. cellulose, amylase, maltase, pectinase, chitinase; esterases which hydrolyze esters, e.g. lipase, cholinesterase, lecithinase, phosphatase; nucleases which hydrolyze nucleic acid, e.g. ribonuclease, desoxyribonuclease; and amidase which hydrolyze amines, e.g. arginase, aspariginase, glutaminase, and urease. The second group are redox enzymes that catalyze oxidation or reduction reactions. These include glucose oxidase, catalase, peroxidase, lipoxidase, and cytochromes. In the third group are transferase enzymes that transfer groups from one molecule to another. Examples of these are glutamicpyruric transaminase, glutamicoxalacetic transaminase, transmethylase, phosphopyruvic transphosphorylase.

The most significant element of the present invention is that the carriers are inorganic materials containing reactive silanol groups. These materials must have a high surface area and be water insoluble. For example in ceramic carriers the amount of enzyme stabilized on the surface of the carrier is a function of the molecular weight of the enzyme and a function of the pore diameter and the surface area of the carrier. As a rough approximation the pore diameter should be at least equal to or greater than the square root of the molecular weight of the enzyme and generally the surface area should be greater than about 0.1 m.²/gram. In terms of chemical compositions, the ceramic carrier must contain reactive silanol groups capable of forming ionic bonds with the amine groups of the enzyme molecule. The preferred carrier is porous glass either in particulate form or as an integral piece such as a disc or cylinder. Glass has the advantage in that it is dimensionally stable and that it can be thoroughly cleaned to remove contaminants such as for example, by sterilization. Porous glass useful as a carrier is readily available and sold commercially by Corning Glass Works as Code 7930 Porous Vycor Glass. Such porous glass can be prepared having various pore dimensions in accordance with the patent of Hood et al. U.S. 2,106,744 and Chapman et al. U.S. patent application Ser. No. 565,372, now U.S. Pat. No. 3,485,687. Other high surface area inorganic carriers containing reactive silanol groups which can also be used include colloidal silica commercially available under the trademark Cab-O-Sil, wollastonite which is a natural occurring calcium silicate, dried silica gel and the like.

The bonding of the enzyme to the carrier is a single step reaction that does not employ a coupling agent. This reaction involves hydrogen bonding and ionic bonding by means of the amine group of the enzyme and the silanol group of the ceramic carrier. More specifically, hydrogen bonding may occur through functional groups on the enzyme, e.g. carbonyl, amide, sulfhydryl and hydroxyl groups: while ionic type bonding is an amine-silicate bond at terminal or residual amines of the enzyme. To avoid loss of enzyme activity, there should be a substantial absence of bonding at the active sites on the enzyme molecule.

Briefly in the method of the present invention, enzyme powder is dissolved in a buffer solution and assayed. The enzyme is then bonded to a pretreated surface reactive ceramic carrier generally at below room temperature. The excess enzyme is removed and the bonded enzyme is rinsed with distilled water and buffer. Thereafter the bonded enzyme-carrier is leached and assayed until a stabilized value is obtained and finally the stabilized enzyme is stored in water or buffer at room temperature or below. In bonding the enzyme to the ceramic carrier the aqueous enzyme solution is placed in contact with the carrier at a temperature below room temperature preferably about 5° C. since enzymes are more stable at very low temperatures. After remaining in contact with the carrier for about 1–72 hours, the stabilized enzyme is bound to the ceramic surface and any excess enzyme is removed. The initial uptake of protein by glass is isoelectric point dependent. The higher the isoelectric point of the molecule, that is, the more basic the protein because of the presence of amine groups, the greater the amount of protein bound in the initial reaction which is the chemical bonding of basic amine groups to reactive silanol groups of the glass. It is important that the pH of the solution during bonding is such that the enzyme does not denature, preferably this should be on the acid side of the isoelectric point. It is important to leach out unbound enzyme before a stabilized assay value is obtained. Leaching may be a matter of hours and even up to many days. The length of the leaching period appears to be a function of the pore size of the ceramic. The small pore diameter ceramics, that is pores approaching the molecular dimensions of the enzyme, require longer leaching periods of from about 6–16 days. The large pore material, such as fritted glass and wollastonite demonstrate little or no leaching periods. This appears to indicate that the leaching is a result of the combination of loosely bound enzyme within the pore and reduced diffusion rates due to the approach of the pore dimensions to the molecular dimensions of the enzyme. An induced negative charge across the first layer of bound enzyme may loosely bond second and third enzyme layers.

In preparing the carrier for bonding of the enzyme, it is frequently necessary to pretreat the carrier for the purpose of making the silanol groups more readily available and reactive. If, for example, the porous glass is not pretreated, it may contain many different contaminating substances which occupy the available bonding sites. By cleaning the surface of the glass, substantially all the active sites become available. A typical cleaning procedure for porous glass is as follows. A sample of porous glass is ultrasonically cleaned in a dilute nitric acid solution at about 80° C. for an hour and a half, then rinsed with distilled water and transferred to a furnace. The temperature is then raised to about 625° C. and maintained thereat for 15–90 minutes while flushing the furnace continuously with oxygen. The sample is then cooled in a stream of oxygen and equilibrated under reduced pressure against water vapor. In the case of wollastonite the material is ultrasonically cleaned in water until the pH approaches neutral and then subjected to a similar heating cycle as described for porous glass.

The product obtained by my novel method is an immobilized enzyme which is water insoluble. The enzyme has been stabilized to give a constant level of activity over a long period of time. When stored at temperatures of 5° C. or even at room temperature over a period of months, the bonded enzyme exhibits a constant level of activity with repeated exposure to assay conditions. The amount of enzyme stabilized is a function of the molecular weight of the enzyme and the pore diameter and surface area of the ceramic carrier as discussed hereinabove.

My invention is further illustrated by the following examples.

EXAMPLE I

A representative nuclease enzyme designated as RNAase having the following properties was prepared: molecular weight 12,700, isoelectric point pH 7.8, activity of preparation 1530 units/mg.

Assay conditions: 4 minute incubation at 37° C. in 0.1 M acetate buffer pH 5.0. Substrate—1% ribonucleic acid in buffer. Precipitant—0.75% Uranyl Acetate in 25% perchloric acid.

Unit activity definition: one unit is equivalent to the amount of acid soluble oligonucleotide which causes an increase of spectrophotometric absorption at 260 m$\mu$ of 1.0 in four minutes at pH 5.0.

The carrier was a porous glass sample of Code 7930, cylinder, O.D. 1.2 cm., I.D. 1.0 cm., length 2 inches, weight 2.0 grams, pore diameter 74 A., surface area 113 m.$^2$/gm. Sample was cleaned by soaking in 1.2 M HCl for 30 minutes. The sample was then transferred to a furnace and the temperature was raised slowly to 550° C. and maintained at that temperature for 3 hours. After cooling, the glass was immersed in and equilibrated against 0.1 M acetate buffer, pH 5.0, overnight.

Bonding of enzyme: The glass cylinder was placed in a test tube. The tube was immersed in a 5° C. water bath, and 6 ml. of solution containing 0.5 mg. RNAase/ml. in 0.1 M acetate buffer, pH 5.0 was added to the tube. The enzyme was permitted to react with the cylinder for 6 hours at 5° C. The cylinder was removed from the enzyme solution and extracted twice with the buffer.

Assay and storage RNAase cylinder: The cylinder was assayed in 20 ml. of a 1:1 acetate buffer diluted ribonucleic acid solution. After 4 minutes of incubation a 2 ml. aliquot was removed for analysis. Between analyses the cylinder was first washed thoroughly with the buffer and then stored in the buffer at 5° C.

The results of this study indicated an initial activity of 0.040 mg./gm. of glass. After a leaching period of approximately 12 days, the cylinder reaches a relatively constant activity level equivalent to 0.0075 mg. RNAase per gram of glass. The activity remained at this level over a 111-day period.

The protein bound to the glass was calculated by determining optical densities at 280 m$\mu$ of the original enzyme solution, the solution used for binding and the extracts. Initially, 5% of the bound enzyme was active. This figure fell to 1.2% after the leaching period.

EXAMPLE II

A representative proteolytic enzyme, papain, was prepared having the following properties: molecular weight 21,000, isoelectric point pH 8.75, activity of preparation 0.01 units/mg.

Assay conditions (modified Kunitz procedure): 60 minute incubation at 40° C. in 0.1 M phosphate buffer, pH 5.8, which contained 0.005 M cysteine and 0.001 M ethylenediamine tetraacetic acid (EDTA). Substrate—1% boiled casein in buffer. Precipitant—5% trichloroacetic acid.

Unit activity definition: one unit is equivalent to the amount of acid soluble peptide producing a change in optical density at 280 m$\mu$ of 0.001 per minute.

The carrier was a porous glass sample of Code 7930, cylinder, O.D. 1.2 cm., I.D. 1.0 cm., length 1 inch, weight 1.27 grams, pore diameter 68 A., surface area 118 m.$^2$/gm. Sample was ultrasonically cleaned in 0.2 N HNO$_3$ at 80° C. The sample was transferred to an oven and the temperature was slowly raised to 100° C. and maintained at this temperature for 1 hour. The glass was then transferred to a water dessicator to equilibrate against water vapor. The glass was not buffer equilibrated before use.

Bonding of enzyme: The glass cylinder was placed in a test tube; the tube was immersed in a 5° C. bath, and 4 ml. of 0.1 M phosphate buffer, pH 6.95 containing 4 mg. papain 1 ml. was added. The enzyme was allowed to react with the cylinder for 1½ hours at 5° C. The cylinder was removed from the enzyme solution and extracted twice with water.

Assay and storage of Papain cylinder: The cylinder was assayed in 5 ml. of a 1:1 buffer diluted substrate solution containing 0.005 M cysteine and 0.001 M ethylene diamine tetraacetic acid after 1 hour of incubation a 4-ml. aliquot was withdrawn for analysis. Between analyses the cylinder was extracted with water and then either stored in water or 0.1 M phosphate buffer, pH 5.8 containing 0.01 M cysteine and 0.002 M ethylenediamine tetraacetic acid at 5° C. (the solution used for storage had no apparent effect on the results).

After a leaching period of approximately 16 days, the cylinder reaches a relatively constant activity level equivalent to 0.07 mg. papain per gram of glass. The activity remained at this level over a 122-day period.

Initially 90% of the bound enzyme was active. This figure fell to 4% after the leaching period.

EXAMPLE III

Using the papain enzyme of Example II, the following experiment was performed.

Porous glass sample: Code 7930, cylinder, O.D. 1.2 cm., I.D. 1.0 cm., length 1 inch, weight 1.26 grams, pore diameter 68 A., surface area 118 m.$^2$/gm. Sample was ultrasonically cleaned in 0.2 N HNO$_3$ at 80° C. for 1½ hours. The sample was transferred to an oven, and the temperature was slowly raised to 180° C. and maintained at this temperature overnight. The glass was cooled and water vapor equilibrated. The glass was not buffer equilibrated before use.

Bonding of enzyme: The glass cylinder was placed in a test tube; the tube was immersed in a 5° C. bath, and 4 ml. of 0.1 M phosphate buffer, pH 8.7 containing 1 mg. papain/ml. was added. The enzyme was allowed to react with the glass for 2 hours at 5° C. The cylinder was removed from the enzyme solution and extracted with pH 8.7 buffer.

Storage of papain cylinder: Between analyses the cylinder was stored in 0.1 M phosphate buffer, pH 5.8, containing 0.01 M cysteine and 0.002 M ethylenediamine tetraacetic acid at room temperature.

The cylinder maintains a constant activity level equivalent to 0.04 mg. papain per gram of glass. The activity remained at this level over an 86-day period.

EXAMPLE IV

Using the papain enzyme of Example II, the following experiment was performed.

Porous glass sample: Code 7930, cylinder, O.D. 1.1 cm., I.D. 1.0 cm., length 3.5 cm., weight 0.8 gm. (this piece of glass was the inner wall of a cylinder that had separated at the leach plane). Pore diameter 92 A., surface area 60 m.$^2$/gm. Sample was ultrasonically cleaned in 0.2 N HNO$_3$ at 80° C., transferred to an oven and the temperature was slowly raised to 200° C. The sample was maintained at this temperature overnight. The glass was cooled and water vapor equilibrated. The sample was not buffer equilibrated before use.

Bonding of enzyme: The papain was bonded to the glass from a 0.1 M phosphate buffer, pH 6.95. The glass was exposed to 5 ml. of enzyme solution (4 mg. papain/ml.) for 1 hour at 5° C. The glass was extracted five times with water and one time with 0.1 M phosphate buffer, pH 5.8, containing 0.01 M cysteine, and 0.002 M ethylenediamine tetraacetic acid.

Storage of papain cylinder: Between analyses the cylinder was stored in 0.1 M phosphate buffer, pH 5.8 containing 0.01 M cysteine and 0.002 M ethylenediamine tetraacetic acid at 5° C.

This cylinder was assayed 40 times over an 82-day period. After a 12-day leaching period a relatively constant activity level equivalent to 0.08 mg. papain per gram of glass was obtained which remained constant over a 70-day period.

EXAMPLE V

Using the papain enzyme of Example II, the following experiment was performed.

Porous glass sample: Code 7930, cylinder, O.D. 1.2 cm., I.D. 1.0 cm., length 1 inch, weight 1.3 grams, pore diameter 68 A., surface area 118 m.$^2$/gm. Sample was ultrasonically cleaned in 0.2 N HNO$_3$ at 80° C. for 1½ hours. The sample was transferred to an oven, and the temperature was slowly raised to 180° C. and maintained at this temperature overnight. The glass was cooled and water vapor equilibrated. The glass was not buffer equilibrated before use.

Bonding and cross-linking of enzyme: The papain was bonded to the glass from 0.1 M phosphate buffer, pH 6.95 at 5° C. The glass was exposed to 4 ml. of solution containing 2 mg. papain/ml. for 4 hours. The glass was extracted once with water. The enzyme bound to the glass was cross-linked in a 1% formaldehyde solution overnight at 5° C. The cylinder was then extracted 3 times with water and finally one time with 0.1 M phosphate buffer, pH 5.8 containing 0.01 M cysteine and 0.002 M EDTA.

Storage of cross-linked papain cylinder: Between analyses the cylinder was stored in 0.1 M phosphate buffer, pH 5.8 containing 0.01 M cysteine and 0.002 M EDTA at 5° C.

After a leaching period of 9 days the glass exhibits a constant level of activity equivalent to 0.09 mg. papain per gram of glass. This level has been maintained over a 48-day period and appears to be approximately 1.3 times greater than the non-cross-linked bound papain.

EXAMPLE VI

Using the papain enzyme of Example II the following experiment was performed.

Fine fritted glass sample: Code 7740 borosilicate glass, four 20 mm. plain edge discs, total weight 4.63 grams, pore diameter 50,000 A., surface area 0.2 m.$^2$/gm. Sample was ultrasonically cleaned in 0.2 N HNO$_3$ at 80° C. for 1½ hours. The sample was transferred to an oven, and the temperature was slowly raised to 200° C. and maintained at this temperature for 2 hours. The glass was cooled. The glass was not buffer or water vapor equilibrated.

Bonding of enzymes: The papain was bonded to the glass from 0.1 M phosphate buffer, pH 6.95. The 4 glass discs were exposed to 5 ml. of enzyme solution (0.84 mg. papain/ml.) for 17 hours at 5° C. The glass was extracted twice with buffer and twice with water.

Storage of papain fritted discs: Between analyses the discs were stored in 0.1 M phosphate buffer, pH 5.8, containing 0.01 M cysteine and 0.002 M EDTA at 5° C.

After a one-day leaching period the glass exhibits a constant level of activity equivalent to 0.014 mg. papain per gram of glass. This level has been maintained over an 83-day period.

EXAMPLE VII

Using the papain enzyme of Example II, the following experiment was performed.

Porous glass particles —60 to +80 mesh, weight 1.0 gram, pore diameter 900 A., surface area 20 m.$^2$/gm. The samples was cleaned by exposing it to 625° C. in the presence of oxygen for 15 minutes. The sample was cooled in a stream of $O_2$ and then equilibrated under reduced pressure against water vapor. The sample was not buffer equilibrated before use.

Bonding of enzyme: The papain was bonded to the glass from 0.1 M phosphate buffer pH 6.95. One gram of glass particles was exposed to 4 ml. of enzyme solution (4 mg. papain/ml.) for 70 hours at 5° C. The glass was extracted two times with buffer and then with water. The enzyme-glass particles were transferred to a piece of filter paper and the paper was bound with thread. The paper wrapped particles were used as a "tea-bag" for the enzyme determinations.

Assay and storage of paper wrapped papain particles: The "tea-bag" was assayed in 15 ml. of a 1:1 buffer diluted substrate solution (pH 5.8) containing 0.005 M cysteine and 0.001 M EDTA. After 1 hour of incubation at 40° C. 4 ml. aliquots were withdrawn for analysis. Between analyses the "tea-bag" was stored at 5° C. in 0.1 M phosphate buffer, pH 5.8 containing 0.01 M cysteine and 0.002 M EDTA.

After a one-day leaching period the glass exhibits a constant level of activity equivalent to 0.33 mg. papain per gram of glass. This level has been maintained over a 43-day period.

EXAMPLE VIII

Using the papain enzyme of Example II the following experiment was performed.

Porous silica glass formed by drying an alkali-free silica gel—chunk of glass irregular in shape, weight 0.793 gram, pore diameter 75 A., surface area 398 m.$^2$/gm. The sample was cleaned by slowly raising the temperature to 625° C. in the presence of an $O_2$ stream. The sample was maintained at this temperature for 45 minutes and then cooled by blasting an $O_2$ stream on it. The glass was water vapor equilibrated under reduced pressure. The sample was not buffer equilibrated before use.

Bonding of enzyme: The papain was bonded to the chunk of silica gel glass in 0.1 M phosphate buffer, pH 6.95. The glass was exposed to 6 ml. of enzyme solution (2 mg. papain/ml.) for 17 hours at 5° C. The glass was extracted once with buffer and 10 times with water.

Assay and storage of papain silica gel chunk: The glass chunk was assayed in 6 ml. of a 1:1 pH 5.8 buffer diluted substrate solution containing 0.005 M cysteine and 0.001 M EDTA. After 1 hour of incubation at 40° C. a 4-ml. aliquot was withdrawn for analysis. Between analyses the chunk was stored at 5° C. in 0.1 M phosphate buffer, pH 5.8 containing 0.01 M cysteine and 0.002 M EDTA.

After a leaching period, greater than 6 days, the glass exhibits a level of activity equivalent to approximately 0.055 mg. papain per gram of glass.

EXAMPLE IX

Using the papain enzyme of Example II, the following experiment was performed.

Wollastonite sample: A cylinder, O.D. 0.9 cm., I.D. 0.8 cm., length 1 inch, weight 0.925 g. pore diameter <150 A. through 4500 A., surface area (0.1 m.$^2$/gm.). The sample was cleaned by slowly raising the temperature to 625° C. in the presence of an $O_2$ stream. The sample was maintained at this temperature for 45 minutes and then cooled by blasting an $O_2$ stream on it. The wollastonite was water vapor equilibrated under reduced pressure. The sample was no buffer equilibrated before use.

Bonding of enzyme: The papain was bonded to the wollastonite in 0.1 M phosphate buffer, pH 6.95. The sample was exposed to 4 ml. of enzyme solution (2 mg. papain/ml.) for 17 hours at 5° C. The wollastonite was extracted once with buffer and 10 times with water.

Assay and storage of papain wollastonite cylinder: The cylinder was assayed in 5 ml. of a 1:1 pH 5.8 buffer diluted substrate solution containing 0.005 M crysteine and 0.001 M EDTA. After 1 hour of incubation at 40° C. a 4-ml. sample was withdrawn for analysis. Between analyses the cylinder was stored at 5° C. in 0.1 M phosphate buffer, pH 5.8, containing 0.01 M cysteine and 0.002 M EDTA.

Although the activity values in this study are very scattered it may be seen that no leaching period is apparent. The overall level of activity over a 35-day period appears to be 0.11 mg. papain per gram of wollastonite.

EXAMPLE X

A representative redox enzyme, glucose oxidase, was prepared having the following properties: molecular weight 150,000, isoelectric point 4.3, activity of preparation 45.5 $\mu$/mg.

Assay conditions: The incubation is performed at room temperature in 0.01 M phosphate buffer, pH 7.0. Substrate—22.4 mg. $\beta$-D-glucose/ml. buffer (final concentration 18 mg./ml.). To determine $H_2O_2$ produced a 2.5 ml. aliquot of reaction-mixture is removed and 0.025 ml. of 1% O-dianisidine in methanol is added followed by 0.5 ml. of peroxidase (0.04 mg./ml.) solution.

Unit activity definition: a unit is equivalent to the production rate of 1 micromol $H_2O_2$ per hour at room temperature. The production of $H_2O_2$ is determined by its decomposition in the presence of peroxidase and O-dianisidine. The oxidation of O-dianisidine is determined by the increase in optical density at 460 m$\mu$.

Porous glass sample: Code 7930 cylinder, O.D. 1.2 cm., I.D. 1.0 cm., length 1 inch, weight 1.3 grams, pore diameter 68 A., surface area 118 m.$^2$/gm. Sample was cleaned ultrasonically in 0.2 N $HNO_3$ at 80° C. for 1½ hours. The sample was transferred to an oven and the temperature was slowly raised to 180° C. and maintained at this temperature overnight. The glass was cooled and equilibrated against 0.01 M phosphate buffer, pH 7.0, for one hour.

Bonding of enzyme: The enzyme was bonded to the glass from 0.01 M phosphate buffer, pH 7.0. The cylinder was exposed to 4 ml. of glucose oxidase solution (2 mg./ml.) for 1 hour at 5° C. The cylinder was extracted with water.

Storage of glucose-oxidase cylinder: The cylinder was stored in 0.01 M phosphate buffer, pH 7.0 at room temperature between analyses.

After a 3-day leaching period the cylinder exhibited a level of activity equivalent to 0.0001 mg. of glucose oxidase.

EXAMPLE XI

Using the glucose oxidase enzyme of Example X, the following experiment was performed.

Porous glass sample: particles —60 to +80 mesh, weight 1.0 gram, pore diameter 900 A., surface area 20 m.$^2$/gm. The sample was cleaned by exposing it to 625° C. in the presence of oxygen for 15 minutes. The sample was cooled in a stream of $O_2$ and then equilibrated under reduced pressure against water vapor. The glass was not buffer equilibrated before use.

Bonding of enzyme: The glucose oxidase was bonded to the glass from 0.1 M phosphate buffer, pH 6.95. One gram of glass particles was exposed to 4 ml. of enzyme solution (5 mg. glucose oxidase/ml.) for 70 hours at 5° C. The glass was extracted two times with buffer and then with water. The enzyme-glass particles were transferred to a piece of filter paper and the paper was bound with thread. The paper wrapped particles were used as a "tea-bag" for enzyme determinations.

Assay and storage of paper wrapped glucose oxidase particles: The "tea-bag" was assayed in 125 ml. of 0.01

M phosphate buffer, pH 6.95, solution containing 18 mg. glucose/ml. at room temperature. 2.5-ml. aliquots were removed at 3-minute intervals for analysis. Between analyses the "tea-bag" was stored at 5° C. in 0.01 M phosphate buffer, pH 6.95.

Over the initial 17 days of storage no apparent leaching period was noted and the glass appeared to exhibit a constant level of activity equivalent to 0.123 mg. glucose oxidase per gram of glass. On the 21st day a dramatic drop to approximately 40% of the activity level was noted. This loss of activity was attributed to exposures of the enzyme to $CS_2$ and $C_2H_5OH$ vapors. With repeated analyses during the next 24 hours an activity recovery was noted to the point of 78% of the original constant activity level. Additional losses of activity were noted after additional 20-day interval and 41-day interval. After 64 days of storage the activity level exhibited was equivalent to 0.04 mg. glucose oxidase per gram of glass. At this point it was noted that a heavy microbial growth appeared on the "tea-bag" paper surface. The losses of activity, therefore, may be due to the production of an inhibitor or destruction of the enzyme by the microbe.

Some of the results of the examples above are summarized in the table. The data is compared to a nonporous glass tube.

TABLE.—RELATION OF BONDED ENZYME TO CARRIER PARAMETERS

| Carrier | Pore diameter, A. | Enzyme (M.W.) | Surface area, m.²/gm. | Mg. enzyme bound/gm. ceramic |
|---|---|---|---|---|
| Borosilicate, glass tube | (¹) | Papain (21,000) | (²) | 0 |
| Example VI | 50,000 | do | 0.2 | 0.014 |
| Example VII | 900 | do | 20 | 0.33 |
| Example IV | 92 | do | 60 | 0.08 |
| Example II | 68 | do | 118 | 0.07 |
| Example XI | 900 | Glucose oxidase (150,000) | 20 | 0.12 |
| Example X | 68 | do | 118 | 0.0001 |

¹ Nonporous. ² Very low.

The results in the table indicate that:

(1) As the surface area of the carrier is increased, the amount of enzyme (papain) bound is correspondingly increased, until the port dimensions approximate the molecular dimensions of the enzyme. At that point less surface area of the carrier is available for bonding with a resulting decrease in the amount of enzyme bound.

(2) The effect of the molecular dimensions of the enzyme, e.g. M.W., indicates for a given porous carrier as the molecular weight of the enzyme increases the amount of enzyme bonded decreases. However, there is an optimum pore size for a particular enzyme and this point is reached when the pore diameter is equivalent to approximately the square root of the enzyme.

It will be apparent to those skilled in the art that many variations and modifications of the invention as hereinabove set forth may be made without departing from the spirit and scope of the invention. The invention is not limited to those details and applications described, except as set forth in the appended claims.

I claim:

1. A stabilized enzyme composite which is substantially water insoluble and capable of repeatedly catalyzing reactions without loss of activity comprising an enzyme having available amine groups coupled to a porous glass carrier having a high surface area and reactive silanol groups, said enzyme being coupled to said carrier by means of amine-silicate bonds and by hydrogen bonding.

2. The stabilized enzyme composite of claim 1, wherein said enzyme is a member selected from the group consisting of hydrolytic enzymes, redox enzymes, and transferases.

3. The stabilized enzyme composite of claim 1, wherein said enzyme is papain and said carrier is a high silica porous glass having a pore size of 68–900 A.

4. A method of making a stabilized enzyme composite comprising contacting an aqueous solution of an enzyme having available amine groups with a glass carrier, having a high surface area and reactive silanol groups, at up to room temperature and for a sufficient period of time for substantial bonding of the enzyme to the carrier and removing any excess unbound enzyme.

5. The method of claim 4, wherein said enzyme is a member selected from the group consisting of hydrolytic enzymes, redox enzymes, and transferases.

6. The method of claim 4, wherein said solution is at a pH such that denaturation of the enzyme is avoided.

7. The method of claim 4, wherein the carrier is a porous glass subjected to a pretreatment for making the silanol groups of the carrier readily available and reactive.

References Cited

UNITED STATES PATENTS

| | | | |
|---|---|---|---|
| 2,442,452 | 6/1948 | Alderton | 195—66 |
| 2,717,852 | 9/1955 | Stone | 195—17 |

LIONEL M. SHAPIRO, Primary Examiner

U.S. Cl. X.R.

195—68